US011242455B2

(12) United States Patent
Deyrail et al.

(10) Patent No.: US 11,242,455 B2
(45) Date of Patent: Feb. 8, 2022

(54) TUBE CONNECTORS BASED ON A POLYAMIDE COMPOSITION

(71) Applicant: Arkema France, Colombes (FR)

(72) Inventors: Yves Deyrail, Evreux (FR); Thibaut Montanari, Menneval (FR); Zhenzhong Li, Jiangsu (CN); Sylvain Benet, Bernay (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/031,157

(22) Filed: Jul. 10, 2018

(65) Prior Publication Data
US 2019/0077956 A1 Mar. 14, 2019

Related U.S. Application Data

(63) Continuation of application No. 14/477,043, filed on Sep. 4, 2014, now abandoned.

(30) Foreign Application Priority Data

Sep. 5, 2013 (FR) ...................... 13.58494

(51) Int. Cl.
C08L 77/06 (2006.01)
C08L 77/02 (2006.01)
C08K 7/14 (2006.01)
B29C 45/00 (2006.01)
B29D 23/00 (2006.01)
F16L 47/02 (2006.01)
B29K 77/00 (2006.01)

(52) U.S. Cl.
CPC .......... C08L 77/06 (2013.01); B29C 45/0001 (2013.01); B29D 23/003 (2013.01); C08K 7/14 (2013.01); C08L 77/02 (2013.01); B29K 2077/00 (2013.01); C08L 2205/02 (2013.01); C08L 2205/025 (2013.01); F16L 47/02 (2013.01)

(58) Field of Classification Search
None
See application file for complete search history.

(56) References Cited

U.S. PATENT DOCUMENTS

| 2,705,227 | A | 3/1955 | Stamatoff | |
| 6,199,916 | B1* | 3/2001 | Klinger | B29C 65/0672 156/73.5 |
| 2002/0066526 | A1 | 6/2002 | Isobe et al. | |
| 2002/0119335 | A1* | 8/2002 | Nozaki | B29C 66/71 428/474.9 |
| 2004/0171764 | A1 | 9/2004 | Isobe et al. | |
| 2005/0121105 | A1* | 6/2005 | Kaneko | B60K 15/04 141/301 |
| 2005/0288451 | A1 | 12/2005 | Liedloff et al. | |
| 2009/0098325 | A1 | 4/2009 | Uchida et al. | |
| 2009/0252979 | A1 | 10/2009 | Ferreiro et al. | |
| 2011/0023986 | A1 | 2/2011 | Hoffmann | |
| 2011/0217559 | A1 | 9/2011 | Bollmann et al. | |
| 2012/0279605 | A1 | 11/2012 | Nozaki et al. | |
| 2013/0023613 | A1 | 1/2013 | Klatt et al. | |

FOREIGN PATENT DOCUMENTS

| EP | 0635670 A1 | 1/1995 |
| EP | 0735098 A2 | 10/1996 |
| EP | 0997496 A1 | 5/2000 |
| EP | 1 195 419 A2 | 4/2002 |
| EP | 1195419 A2 | 4/2002 |
| EP | 1 552 916 A | 7/2005 |
| EP | 1860134 A1 | 11/2007 |
| EP | 2290004 A2 | 3/2011 |
| EP | 0 703 435 A1 | 3/2014 |
| EP | 2703435 A1 | 3/2014 |
| JP | 3006594 U | 1/1995 |
| JP | 2001011307 A | 1/2001 |
| JP | 2002188786 A | 7/2002 |
| JP | 2003089773 A | 3/2003 |
| JP | 2004090628 A | 3/2004 |
| JP | 2005153693 A | 6/2005 |
| JP | 2006002156 A | 1/2006 |

(Continued)

OTHER PUBLICATIONS

Definition of Weld, Dictionary.com, http://dictionary.reference.com/browse/weld, p. 1.
French Search Report dated Jun. 10, 2014 for French Application No. 1358494.
Office Action (Notice of Rejection) dated Aug. 7, 2018, by the Japanese Patent Office in corresponding Japanese Patent Application No. 2014-16485, and an English Translation of the Office Action. (9 pages).
Office Action (Notice of Rejection) dated Dec. 10, 2019, by the Japanese Patent Office in corresponding Japanese Patent Application No. 2014-164685, and an English Translation, (7 pages).
Ellis, T. S."Mixing relationships in aliphatic polyamide blends" POLYMER, 1992, vol. 33, No. 7, pp. 1469-1476.
Communication of a notice of opposition of EP Application No. 14180208.2 dated Sep. 3, 2019, 25 pages.

(Continued)

Primary Examiner — Robert T Butcher

(74) Attorney, Agent, or Firm — Buchanan Ingersoll & Rooney P.C.

(57) ABSTRACT

A tube connector made from a polyamide composition, the polyamide composition including at least one first polyamide A having an average number of carbon atoms per nitrogen atom $C_A$ and at least one second polyamide B having an average number of carbon atoms per nitrogen atom $C_B$, wherein $C_A \leq 8.5$ and $C_B \geq 7.5$, and wherein $C_A < C_B$. The composition may include a third polyamide C having an average number of carbon atoms per nitrogen atom $C_C$, wherein $C_B \leq C_C$.

31 Claims, No Drawings

(56) References Cited

FOREIGN PATENT DOCUMENTS

| | | | |
|---|---|---|---|
| JP | 2007307913 A | 11/2007 |
| JP | 201360534 A | 4/2013 |
| JP | 2014043549 A | 3/2014 |
| KR | 10-2011-0013283 A | 2/2011 |
| WO | 2006098434 A | 8/2008 |
| WO | 2009/027231 A1 | 3/2009 |
| WO | 2011/120949 A1 | 10/2011 |
| WO | 2011120949 A1 | 10/2011 |

OTHER PUBLICATIONS

Communication pursuant to Article 101(1) and Rule 81 (2) to (3) EPC (Examination to the Opposition) of EP Application No. 14180208.2 dated Jul. 3, 2020, 12 pages.

Becker et al., "Kunststoff Handbuch 3/4, Polyamide", 1998, pp. 440-441. (English copy not available).

Gooch Jan W., "Encyclopedic Dictionary of Polymers", Springer, vol. 2, 2007, pp. 1064.

ISO 294-4, "Plastics—Injection moulding of test specimens of thermoplastic materials—Part 4: Determination of moulding shrinkage", Second edition, Dec. 15, 2001, 16 pages.

Kohan et al., "Nylon Plastics Handbook", Hanser, 1995, pp. 464-469.

Kohan et al., "Nylon Plastics Handbook", Hanser, 1995, pp. 592-593.

Office Action (Notice of Final Rejection) dated Jan. 19, 2021, by the Korean Intellectual Property Office in corresponding Korean Patent Application No. 10-2014-0117647, and an English Translation of the Office Action. (6 pages).

* cited by examiner

TUBE CONNECTORS BASED ON A POLYAMIDE COMPOSITION

CROSS REFERENCE TO RELATED APPLICATIONS

The present application is a continuation of U.S. application Ser. No. 14/477,043, filed on Sep. 4, 2014, which claims the benefit of French Application No. 13.58494, filed on Sep. 5, 2013. The entire contents of each of U.S. application Ser. No. 14/477,043 and French Application No. 13.58494 are hereby incorporated herein by reference in their entirety.

TECHNICAL FIELD

Embodiments of the disclosure relates to tube connectors or tube connector parts based on a polyamide composition as well as to a process for making same.

TECHNICAL BACKGROUND

Tubes are needed to store and convey different types of fluids. For instance, in motor vehicles, tubes are used for feeding fuel from the tank to the engine, for the cooling circuit, for the hydraulic system, for the air-conditioning system, etc.

Polyamides are widely used for making such tubes. In view of all the technical requirements at stake, it is often necessary to resort to multilayer structures. For instance, use is commonly made of at least one outer layer based on polyamide having a relatively high average number of carbon atoms per nitrogen atom (such as PA 11 or PA 12), providing the desired flexibility and mechanical resistance to the tubes; and of at least one inner layer called a barrier layer, providing the required impermeability to the conveyed fluids. Polyamides having a relatively low average number of carbon atoms per nitrogen atom (such as PA 6 or PA 6.6 for instance), as well as non-polyamide materials such as ethylene-vinyl alcohol copolymer, may be included in the barrier layer.

The above tubes are either linked together or linked to functional parts (such as filters), using connectors.

Conventional connectors are usually manufactured by injection molding, using a polyamide material, such as PA 11 or PA 12, generally reinforced with glass fibers.

A conventional method to link the connectors to the tubes and/or functional parts is based on mechanical anchoring achieved owing to a relief on the connectors.

A safer and more effective fixation method involves the partial melting of the polymers in the connectors and tubes and/or functional parts. Such partial melting may be achieved for example by spin welding, ultrasound welding or the like. However, the adhesion of one substrate made from a polyamide to another substrate made from another polyamide is variable: for instance the adhesion of PA 12 with PA 12 or PA 11 is good, but the adhesion of PA 12 with PA 6 is not.

There is therefore still a need for connectors exhibiting a better adhesion with respect to various kinds of tubular substrates, and in particular with respect to various types of polyamide-based tubular substrates, especially in the context of a welding assembly process such as spin welding.

Another constraint is that shrinkage should remain as low as possible at the end of the manufacturing process (just like with conventional connectors made from PA 12 for instance).

SUMMARY

It is a first object of an embodiment of the disclosure to provide a tube connector part made from a polyamide composition, the polyamide composition comprising at least one first polyamide A having an average number of carbon atoms per nitrogen atom $C_A$ and at least one second polyamide B having an average number of carbon atoms per nitrogen atom $C_B$, wherein $C_A \leq 8.5$ and $C_B \geq 7.5$, and wherein $C_A < C_B$.

According to one embodiment, the mass-weighted mean of the heats of fusion of these polyamides A and B in the said composition is greater than 25 J/g (DSC, ISO 11357-3 (2013)).

According to one embodiment, each of the polyamides A and B has a heat of fusion of greater than 25 J/g (DSC, ISO 11357-3 (2013)).

The tube connector part may be a complete connector or may represent only part of a tube connector, such as an end part intended to provide the connection with at least one tube or functional part, e.g. by welding.

According to one embodiment, the difference $C_B - C_A$ is from 1 to 6, more preferably from 2 to 4, or from 2 to 3.

According to one embodiment, $C_A \leq 7.5$, preferably $C_A \leq 6.5$ and most preferably $C_A = 6$.

According to one embodiment, B is different from a PA 6/12 copolyamide provided that the composition comprises or consists of two polyamides A and B.

According to one embodiment, A and B are different from a PA 6/12 copolyamide provided that the composition comprises only or consists in two polyamides A and B.

According to one embodiment, the at least one first polyamide A is selected from PA 6, PA 4.6, PA 6.6, PA 6/6.6, PA 6/6.T, PA 6.6/6.T, PA 6.6/6.I, PA 6.I/6.T, PA 6.6/6.I/6.T, PA 6.10 and mixtures thereof, and preferably is PA 6.

According to one embodiment, the composition comprises from 1 to 70 wt. %, preferably from 2 to 60 wt. % and more preferably from 3 to 50 wt. %, in particular from 3 to 35% wt. % of the at least one first polyamide A.

According to one embodiment, the second polyamide B is selected from PA 6.10, PA 6.12, PA 6.14, PA 10.10, PA 11, PA 12, PA 10.12, PA 6.18, PA 12.T, PA 12/10.T, PA 10.10/10.T, PA B.12, PA B.10/10.10, PA IPD.10, PA B.I/12 and mixtures thereof, preferably from PA 6.10, PA 6.12, PA 10.10, PA 10.12, PA 12 and mixtures thereof, and more preferably is PA 6.12, optionally in admixture with another polyamide.

According to one embodiment, the composition comprises from 1 to 70 wt. %, preferably from 10 to 60 wt. % and more preferably from 20 to 50 wt. % of the at least second polyamide B.

According to one embodiment, the composition consists of one first polyamide A, one second polyamide B and optionally non-polyamide additives; and, preferably, the first polyamide A is PA 6 and the second polyamide B is PA 6.12.

According to one embodiment, at least one of A and B in the composition comprising only or consisting in two polyamides is a homopolyamide.

According to one embodiment, A and B in the composition comprising only or consisting in two polyamides are homopolyamides.

According to one embodiment, the composition comprises, in addition to the first polyamide A and the second polyamide B, at least one third polyamide C having an average number of carbon atoms per nitrogen atom $C_C$, wherein $C_C \geq 7.5$ and $C_C \geq C_B$.

According to one embodiment, $C_C \geq 7.5$ and $C_C > C_B$.

According to one embodiment, the mass-weighted mean of the heats of fusion of these polyamides A, B and C in the said composition is greater than 25 J/g (DSC, ISO 11357-3 (2013)).

According to one embodiment, each of the polyamides A, B and C has a heat of fusion of greater than 25 J/g (DSC, ISO 11357-3 (2013)).

In the above defined composition comprising at least a third polyamide C, A and/or B and/or C can be a copolyamide, in particular PA 6/12.

According to one embodiment, the difference $C_C - C_B$ is from 1 to 4, preferably from 2 to 3.

According to one embodiment, the difference $C_B - C_A$ is from 1 to 6, and the difference $C_C - C_B$ is from 1 to 4.

According to one embodiment, the difference $C_B - C_A$ is from 1 to 6, and the difference $C_C - C_B$ is from 2 to 3.

According to one embodiment, the difference $C_B - C_A$ is from 2 to 4, and the difference $C_C - C_B$ is from 1 to 4.

According to one embodiment, the difference $C_B - C_A$ is from 2 to 4, and the difference $C_C - C_B$ is from 2 to 3.

According to one embodiment, the difference $C_B - C_A$ is from 2 to 3, and the difference $C_C - C_B$ is from 1 to 4.

According to one embodiment, the difference $C_B - C_A$ is from 2 to 3, and the difference $C_C - C_B$ is from 2 to 3.

According to one embodiment, $C_A \leq 8.5$, $C_B \geq 7.5$, and $C_C \geq 7.5$, wherein $C_A < C_B$ and $C_C > C_B$ and most preferably $C_A = 8$.

According to one embodiment, $C_A \leq 7.5$, preferably $C_A \leq 6.5$ and most preferably $C_A = 6$.

According to one embodiment, the second polyamide B is selected from PA 6.10, PA 6.12 and a mixture thereof; and/or the third polyamide C is selected from PA 6.14, PA 10.10, PA 11, PA 12, PA 10.12, PA 6.18, PA 12.T, PA 12/10.T, PA 10.10/10.T, PA B.12, PA B.10/10.10, PA IPD.10, PA B.I/12 and mixtures thereof; preferably from PA 10.10, PA 10.12 and PA 12 and a mixture thereof; and more preferably is PA 12.

According to one embodiment, the second polyamide B is PA 6.10; and the third polyamide C is selected from PA 6.14, PA 10.10, PA 11, PA 12, PA 10.12, PA 6.18, PA 12.T, PA 12/10.T, PA 10.10/10.T, PA B.12, PA B.10/10.10, PA IPD.10, PA B.I/12 and mixtures thereof; preferably from PA 10.10, PA 10.12 and PA 12 and a mixture thereof; and more preferably is PA 12.

According to one embodiment, the second polyamide B is PA 6.12; and the third polyamide C is selected from PA 6.14, PA 10.10, PA 11, PA 12, PA 10.12, PA 6.18, PA 12.T, PA 12/10.T, PA 10.10/10.T, PA B.12, PA B.10/10.10, PA IPD.10, PA B.I/12 and mixtures thereof; preferably from PA 10.10, PA 10.12 and PA 12 and a mixture thereof; and more preferably is PA 12.

According to one embodiment, the composition comprises from 1 to 80 wt. %, preferably from 5 to 70 wt. % and more preferably from 10 to 65 wt. % of the at least one second polyamide B; and/or the composition comprises from 1 to 70 wt. %, preferably from 2 to 60 wt. % and more preferably from 3 to 50 wt. % of the at least one third polyamide C.

According to one embodiment, the composition consists of one first polyamide A, one second polyamide B, one third polyamide C and optionally non-polyamide additives; and preferably, the first polyamide A is PA 6, the second polyamide B is PA 6.10 or PA 6.12, and the third polyamide C is PA 10.10, PA 10.12 or PA 12.

According to one embodiment, the composition consists of one first polyamide A, one second polyamide B, one third polyamide C and optionally non-polyamide additives; and preferably, the first polyamide A is PA 6, the second polyamide B is PA 6.10 and the third polyamide C is PA 10.10, PA 10.12 or PA 12.

According to one embodiment, the composition consists of one first polyamide A, one second polyamide B, one third polyamide C and optionally non-polyamide additives; and preferably, the first polyamide A is PA 6, the second polyamide B is PA 6.12, and the third polyamide C is PA 10.10, PA 10.12 or PA 12.

According to one embodiment, the amount of polyamides in the composition is from 30 to 100 wt. %, preferably from 50 to 99 wt. %, more preferably from 60 to 95 wt. %, and most preferably from 65 to 85 wt. %.

According to one embodiment, the composition further comprises additives selected from impact modifiers, processing aids, fillers, stabilizers, nucleating agents, dyes, pigments, fireproofing agents and mixtures thereof; and the composition preferably comprises additives selected from fillers, impact modifiers, stabilizers and combinations thereof; and the composition more preferably comprises:

from 10 to 40 wt. % of fillers, in particular glass fibers; and/or from 0.1 to 2 wt. % of at least one stabilizer; and/or from 5 to 20 wt. % of at least one functionalized impact modifier, in particular a copolymer of ethylene, preferably ethylene propylene elastomer copolymer.

According to one embodiment, the tube connector part is configured for being welded to one or more tubes, preferably by spin welding, said tubes being preferably polyamide tubes.

According to one embodiment, the tube connector part is part of a circuit for conveying liquids or gases in motor vehicles.

An embodiment of the disclosure also relates to a process of making the above-described tube connector part, comprising melting and shaping the polyamide composition.

According to one embodiment, the process is an injection molding process.

An embodiment of the disclosure makes it possible to overcome the drawbacks of the known art. In particular, certain embodiments of the disclosure provide connectors adhering well to various kinds of materials, in particular to various types of polyamide materials, such as PA 6 (or PA 6.T-based copolymers), PA 12 (or PA10.10), PA 6.10 (or PA 6.12) and PA 10.12; besides, these connectors may be manufactured with a satisfactorily low level of shrinkage.

An embodiment of the disclosure is particularly useful in the context of a connection to multilayer tubes containing different polyamide components in the inner and outer layers, such as multilayer tubes having a PA 12-based outer layer and a PA 6-based inner layer. The connectors of an embodiment of the disclosure can advantageously be welded to both types of surfaces and the resistance of the connection can therefore be maximized.

This may be achieved by using a composition comprising at least two (and, according to some preferred embodiments, at least three) polyamide components having different average numbers of carbon atoms by nitrogen atom.

DESCRIPTION OF EMBODIMENTS

An embodiment of the disclosure will now be described in more detail without limitation in the following description.

An embodiment of the disclosure relies on a composition comprising at least two polyamide components, one within a lower range of average number of carbon atoms per nitrogen atom, and the other one within a higher range of average number of carbon atoms per nitrogen atom. Optionally, a third polyamide component may be present in the composition. In this case the first polyamide component is within a low range of average number of carbon atoms per nitrogen atom, the second polyamide component within an intermediate range of average number of carbon atoms per nitrogen atom, and the third polyamide component is within a high range of average number of carbon atoms per nitrogen atom.

Polyamides encompass homopolyamides and copolyamides.

According to the present application, the term "polyamide", also noted PA, is directed towards:
  homopolymers or homopolyamides,
  copolymers or copolyamides, based on different amide units, for instance polyamide 6/12 with amide units derived from lactam-6 and from lactam-12,
  polyamide alloys, provided that the polyamide is the major constituent.

There also exists a category of copolyamides in the broad sense, which, although not preferred, falls within the context of an embodiment of the disclosure. These are copolyamides comprising not only amide units (which will be predominant, hence the fact that they should be considered as copolyamides in the broad sense), but also units of non-amide nature, for example ether units. The best-known examples are the PEBAs or polyether-block-amides and variants thereof copolyamide-ester-ether, copolyamide-ether and copolyamide-ester. Among these, mention will be made of PEBA-12 in which the polyamide units are the same as those of PA12, and PEBA-6.12 in which the polyamides units are the same as those of PA6.12.

The nomenclature used to define polyamides is described in the standard ISO 1874-1:1992 "*Plastics—polyamide (PA) materials for moulding and extrusion—Part 1: Designation*", especially on page 3 (Tables 1 and 2) and is well known to those skilled in the art.

Homopolyamides are generally designated as PA X, wherein X represents the residues of an amino-acid; or PA X.Y, wherein X represents the residues of a diamine and Y represents the residues of a diacid.

For a polyamide PA X, the average number of carbon atoms per nitrogen atoms corresponds to the number of carbon atoms in the amino-acid residue. For instance this average number is 6 for PA 6 (polycaprolactame), 11 for PA 11 (polyundecanamide) and 12 for PA 12 (polydodecanamide).

For a polyamide PA X.Y, the average number of carbon atoms per nitrogen atoms corresponds to the mean of the number of carbon atoms in the diamine X residues and in the diacid Y residues. For instance, this average number is 8 for PA 6.10 (polyhexamethylene sebacate), 9 for PA 6.12 (polyhexamethylene dodecanediamide), 10 for PA 10.10 (polydecamethylene sebacate), 10 for PA 12.T (polydodecamethylene terephthalate—T representing residues from terephthalic acid, comprising 8 carbon atoms), etc.

Copolyamides are generally designated as PA X/Y, or PA X/Y/Z in the case of terpolymers, wherein X, Y and Z represent homopolyamide units as described above.

For such polyamides, the average number of carbon atoms per nitrogen atom corresponds to the molar pro rata of the various amide units.

By way of example, in a PA 6.T/6.6 copolymer containing 60 mol. % of 6.T units and 40 mol. % of 6.6 units, the average number is 6.6 (namely 60%×(6+8)/2+40%×(6+6)/2=6.6).

In case of a copolyamide containing non-amide units, the calculation is performed solely on the amide units. Thus, for example, PEBA 12, which is a block copolymer of amide units of the PA 12 type and of ether units, the mean number of carbon atoms per nitrogen atom is 12, like for PA 12; for PEBA 6.12, it is 9, like for PA 6.12.

The polyamides used in an embodiment of the disclosure may be homopolyamides or copolyamides. Preferably, they are homopolyamides.

Preferably, the copolyamides used in an embodiment of the disclosure contain only amide units.

The composition of an embodiment of the disclosure comprises at least one first polyamide A having an average number of carbon atoms per nitrogen atom $C_A$ and one second polyamide B having an average number of carbon atoms per nitrogen atom $C_B$, with $C_A \leq 8.5$ and $C_B \geq 7.5$ and $C_A < C_B$.

According to some embodiments, $C_A \leq 7.5$; or $C_A < 7.5$.

According to some embodiments, $C_A$ is from 4 to 4.5; or from 4.5 to 5; or from 5 to 5.5; or from 5.5 to 6; or from 6 to 6.5; or from 6.5 to 7; or from 7 to 7.5; or from 7.5 to 8; or from 8 to 8.5. An advantageous range for $C_A$ may be from 5.8 to 6.2.

The first polyamide A is preferably PA 6. Alternatively, other polyamide components may be used such as PA 4.6 (polytetramethylene adipamate), PA 6.6 (polyhexamethylene adipamate), or such as various copolyamides, including PA 6/6.T, PA 6/6.6, PA 6.T/6.6, PA 6.I/6.6 and PA 6.T/6.I/6.6 (I representing residues from isophthalic acid).

PA 6.10 may also be used as the first polyamide A, in which case $C_B$ must be greater than 8. For instance, the second polyamide B may be PA 12 in this case.

Preferably, only one polyamide A is used. Alternatively, it is possible to use a mixture of two or more such polyamides. Combinations of PA 6+PA 4.6 and of PA 6+PA 6.6 are examples of such a mixture.

Turning to the second polyamide B, according to various embodiments, $C_B$ is from 7.5 to 8; or from 8 to 8.5; or from 8.5 to 9; or from 9 to 9.5; or from 9.5 to 10; or from 10 to 10.5; or from 10.5 to 11; or from 11 to 11.5; or from 11.5 to 12; or from 12 to 12.5; or from 12.5 to 13; or from 13 to 13.5; or from 13.5 to 14; or above 14. An advantageous range for $C_B$ may be from 8 to 12.

According to some embodiments, the difference $C_B - C_A$ is from 0.5 to 1; or from 1 to 1.5; or from 1.5 to 2; or from 2 to 2.5; or from 2.5 to 3; or from 3 to 3.5; or from 3.5 to 4; or from 4 to 4.5; or from 4.5 to 5; or from 5 to 5.5; or from 5.5 to 6; or from 6 to 6.5; or from 6.5 to 7.

The second polyamide B may notably be selected from PA 6.10, PA 6.12, PA 6.14, PA 10.10, PA 11, PA 12, PA 10.12 (polydecamethylene sebacamate), PA 6.18, PA 12.T. Copolyamides such as PA 12/10.T and PA 10.10/10.T may also be used, as well as PA B.12, PA B.10/10.10, PA IPD.10 and PA B.I/12, wherein B represents the residue obtained from the condensation of bis-(3-methyl-4-aminocyclohexyl)-methane (BMACM) and IPD represents the residue obtained from the condensation of isophorone diamine.

According to one embodiment, only one polyamide B with an average number of carbon atoms per nitrogen atom $C_B \geq 7.5$ is used. In this case, $C_B$ is preferably greater than 8, more preferably greater than 8.5; and/or the difference $C_B - C_A$ is preferably greater than 1; or greater than 1.5; or greater than 2; or greater than 2.5; or greater than 3.

Alternatively, it is possible to use at least two polyamides having an average number of carbon atoms per nitrogen atom greater than or equal to 7.5. In this case, it is convenient to designate these at least two polyamides as a second polyamide B with an average number of carbon atoms per nitrogen atom $C_B \geq 7.5$, and a third polyamide C with an average number of carbon atoms per nitrogen atom $C_C \geq 7.5$.

Preferably, the second polyamide B has an intermediate average number of carbon atoms per nitrogen atom, namely $7.5 \leq C_B < 10$, and the third polyamide C has a high average number of carbon atoms per nitrogen atom, namely $C_C \geq 10$—although alternatively both polyamides may have average numbers of carbon atoms per nitrogen atom within the same range, i.e. either $7.5 \leq C_B < 10$ and $7.5 \leq C_C < 10$; or $C_B \geq 10$ and $C_C \geq 10$.

According to some embodiments the difference $C_C - C_B$ is from 0.5 to 1; or from 1 to 1.5; or from 1.5 to 2; or from 2 to 2.5; or from 2.5 to 3; or from 3 to 3.5; or from 3.5 to 4; or from 4 to 4.5; or from 4.5 to 5.

In the above case of three polyamides A, B and C, the second polyamide B may notably be selected from PA 6.10 and PA 6.12 and the third polyamide C may notably be selected from PA 6.14, PA 10.10, PA 11, PA 12, PA 10.12, PA 6.18, PA 12.T, PA 12/10.T, PA 10.10/10.T PA B.12, PA B.10/10.10, PA IPD.10, PA B.I/12. PA 12, PA 10.12 and PA 10.10 are preferred.

In the above case of three polyamides A, B and C, the second polyamide B is PA 6.10 and the third polyamide C may notably be selected from PA 6.14, PA 10.10, PA 11, PA 12, PA 10.12, PA 6.18, PA 12.T, PA 12/10.T, PA 10.10/10.T PA B.12, PA B.10/10.10, PA IPD.10, PA B.I/12. PA 12, PA 10.12 and PA 10.10 are preferred.

In the above case of three polyamides A, B and C, the second polyamide B is PA 6.12 and the third polyamide C may notably be selected from PA 6.14, PA 10.10, PA 11, PA 12, PA 10.12, PA 6.18, PA 12.T, PA 12/10.T, PA 10.10/10.T PA B.12, PA B.10/10.10, PA IPD.10, PA B.I/12. PA 12, PA 10.12 and PA 10.10 are preferred.

Preferably, only one polyamide B with an average number of carbon atoms per nitrogen atom $7.5 \leq C_B < 10$ is used. Alternatively, it is possible to use mixtures of two or more such polyamides. A combination of PA 6.10+PA 6.12 is then preferred.

Preferably, only one polyamide C with an average number of carbon atoms per nitrogen atom $C_C \geq 10$ is used. Alternatively, it is possible to use mixtures of two or more such polyamides. A combination of PA 12+PA 10.10 is then preferred.

The weight proportion of each polyamide A, B and optionally C within the total composition may vary significantly.

Some embodiments of binary formulations based on one polyamide A and one polyamide B (plus the optional additives described below), with $C_A \leq 8.5$ and $7.5 \leq C_B$, are summarized in the following table, the weight proportions being relative to the total composition:

| Formulation No. | A (wt. %) | B (wt. %) |
|---|---|---|
| 1 | 1 to 5% | 1 to 5% |
| 2 | 1 to 5% | 5 to 10% |
| 3 | 1 to 5% | 10 to 15% |
| 4 | 1 to 5% | 15 to 20% |
| 5 | 1 to 5% | 20 to 25% |
| 6 | 1 to 5% | 25 to 30% |
| 7 | 1 to 5% | 30 to 35% |
| 8 | 1 to 5% | 35 to 40% |
| 9 | 1 to 5% | 40 to 45% |
| 10 | 1 to 5% | 45 to 50% |
| 11 | 1 to 5% | 50 to 55% |
| 12 | 1 to 5% | 55 to 60% |
| 13 | 1 to 5% | 60 to 65% |
| 14 | 1 to 5% | 65 to 70% |
| 15 | 1 to 5% | 70 to 75% |
| 16 | 1 to 5% | 75 to 80% |
| 17 | 1 to 5% | 80 to 85% |
| 18 | 1 to 5% | 85 to 90% |
| 19 | 1 to 5% | 90 to 95% |
| 20 | 5 to 10% | 1 to 5% |
| 21 | 5 to 10% | 5 to 10% |
| 22 | 5 to 10% | 10 to 15% |
| 23 | 5 to 10% | 15 to 20% |
| 24 | 5 to 10% | 20 to 25% |
| 25 | 5 to 10% | 25 to 30% |
| 26 | 5 to 10% | 30 to 35% |
| 27 | 5 to 10% | 35 to 40% |
| 28 | 5 to 10% | 40 to 45% |
| 29 | 5 to 10% | 45 to 50% |
| 30 | 5 to 10% | 50 to 55% |
| 31 | 5 to 10% | 55 to 60% |
| 32 | 5 to 10% | 60 to 65% |
| 33 | 5 to 10% | 65 to 70% |
| 34 | 5 to 10% | 70 to 75% |
| 35 | 5 to 10% | 75 to 80% |
| 36 | 5 to 10% | 80 to 85% |
| 37 | 5 to 10% | 85 to 90% |
| 38 | 5 to 10% | 90 to 95% |
| 39 | 10 to 15% | 1 to 5% |
| 40 | 10 to 15% | 5 to 10% |
| 41 | 10 to 15% | 10 to 15% |
| 42 | 10 to 15% | 15 to 20% |
| 43 | 10 to 15% | 20 to 25% |
| 44 | 10 to 15% | 25 to 30% |
| 45 | 10 to 15% | 30 to 35% |
| 46 | 10 to 15% | 35 to 40% |
| 47 | 10 to 15% | 40 to 45% |
| 48 | 10 to 15% | 45 to 50% |
| 49 | 10 to 15% | 50 to 55% |
| 50 | 10 to 15% | 55 to 60% |
| 51 | 10 to 15% | 60 to 65% |
| 52 | 10 to 15% | 65 to 70% |
| 53 | 10 to 15% | 70 to 75% |
| 54 | 10 to 15% | 75 to 80% |
| 55 | 10 to 15% | 80 to 85% |
| 56 | 10 to 15% | 85 to 90% |
| 57 | 15 to 20% | 1 to 5% |
| 58 | 15 to 20% | 5 to 10% |
| 59 | 15 to 20% | 10 to 15% |
| 60 | 15 to 20% | 15 to 20% |
| 61 | 15 to 20% | 20 to 25% |
| 62 | 15 to 20% | 25 to 30% |
| 63 | 15 to 20% | 30 to 35% |
| 64 | 15 to 20% | 35 to 40% |
| 65 | 15 to 20% | 40 to 45% |
| 66 | 15 to 20% | 45 to 50% |
| 67 | 15 to 20% | 50 to 55% |
| 68 | 15 to 20% | 55 to 60% |
| 69 | 15 to 20% | 60 to 65% |
| 70 | 15 to 20% | 65 to 70% |
| 71 | 15 to 20% | 70 to 75% |
| 72 | 15 to 20% | 75 to 80% |
| 73 | 15 to 20% | 80 to 85% |
| 74 | 20 to 25% | 1 to 5% |
| 75 | 20 to 25% | 5 to 10% |
| 76 | 20 to 25% | 10 to 15% |
| 77 | 20 to 25% | 15 to 20% |
| 78 | 20 to 25% | 20 to 25% |
| 79 | 20 to 25% | 25 to 30% |
| 80 | 20 to 25% | 30 to 35% |
| 81 | 20 to 25% | 35 to 40% |
| 82 | 20 to 25% | 40 to 45% |
| 83 | 20 to 25% | 45 to 50% |

| Formulation No. | A (wt. %) | B (wt. %) |
| --- | --- | --- |
| 84 | 20 to 25% | 50 to 55% |
| 85 | 20 to 25% | 55 to 60% |
| 86 | 20 to 25% | 60 to 65% |
| 87 | 20 to 25% | 65 to 70% |
| 88 | 20 to 25% | 70 to 75% |
| 89 | 20 to 25% | 75 to 80% |
| 90 | 25 to 30% | 1 to 5% |
| 91 | 25 to 30% | 5 to 10% |
| 92 | 25 to 30% | 10 to 15% |
| 93 | 25 to 30% | 15 to 20% |
| 94 | 25 to 30% | 20 to 25% |
| 95 | 25 to 30% | 25 to 30% |
| 96 | 25 to 30% | 30 to 35% |
| 97 | 25 to 30% | 35 to 40% |
| 98 | 25 to 30% | 40 to 45% |
| 99 | 25 to 30% | 45 to 50% |
| 100 | 25 to 30% | 50 to 55% |
| 101 | 25 to 30% | 55 to 60% |
| 102 | 25 to 30% | 60 to 65% |
| 103 | 25 to 30% | 65 to 70% |
| 104 | 25 to 30% | 70 to 75% |
| 105 | 30 to 35% | 1 to 5% |
| 106 | 30 to 35% | 5 to 10% |
| 107 | 30 to 35% | 10 to 15% |
| 108 | 30 to 35% | 15 to 20% |
| 109 | 30 to 35% | 20 to 25% |
| 110 | 30 to 35% | 25 to 30% |
| 111 | 30 to 35% | 30 to 35% |
| 112 | 30 to 35% | 35 to 40% |
| 113 | 30 to 35% | 40 to 45% |
| 114 | 30 to 35% | 45 to 50% |
| 115 | 30 to 35% | 50 to 55% |
| 116 | 30 to 35% | 55 to 60% |
| 117 | 30 to 35% | 60 to 65% |
| 118 | 30 to 35% | 65 to 70% |
| 119 | 35 to 40% | 1 to 5% |
| 120 | 35 to 40% | 5 to 10% |
| 121 | 35 to 40% | 10 to 15% |
| 122 | 35 to 40% | 15 to 20% |
| 123 | 35 to 40% | 20 to 25% |
| 124 | 35 to 40% | 25 to 30% |
| 125 | 35 to 40% | 30 to 35% |
| 126 | 35 to 40% | 35 to 40% |
| 127 | 35 to 40% | 40 to 45% |
| 128 | 35 to 40% | 45 to 50% |
| 129 | 35 to 40% | 50 to 55% |
| 130 | 35 to 40% | 55 to 60% |
| 131 | 35 to 40% | 60 to 65% |
| 132 | 40 to 45% | 1 to 5% |
| 133 | 40 to 45% | 5 to 10% |
| 134 | 40 to 45% | 10 to 15% |
| 135 | 40 to 45% | 15 to 20% |
| 136 | 40 to 45% | 20 to 25% |
| 137 | 40 to 45% | 25 to 30% |
| 138 | 40 to 45% | 30 to 35% |
| 139 | 40 to 45% | 35 to 40% |
| 140 | 40 to 45% | 40 to 45% |
| 141 | 40 to 45% | 45 to 50% |
| 142 | 40 to 45% | 50 to 55% |
| 143 | 40 to 45% | 55 to 60% |
| 144 | 45 to 50% | 1 to 5% |
| 145 | 45 to 50% | 5 to 10% |
| 146 | 45 to 50% | 10 to 15% |
| 147 | 45 to 50% | 15 to 20% |
| 148 | 45 to 50% | 20 to 25% |
| 149 | 45 to 50% | 25 to 30% |
| 150 | 45 to 50% | 30 to 35% |
| 151 | 45 to 50% | 35 to 40% |
| 152 | 45 to 50% | 40 to 45% |
| 153 | 45 to 50% | 45 to 50% |
| 154 | 45 to 50% | 50 to 55% |
| 155 | 50 to 55% | 1 to 5% |
| 156 | 50 to 55% | 5 to 10% |
| 157 | 50 to 55% | 10 to 15% |
| 158 | 50 to 55% | 15 to 20% |
| 159 | 50 to 55% | 20 to 25% |
| 160 | 50 to 55% | 25 to 30% |
| 161 | 50 to 55% | 30 to 35% |
| 162 | 50 to 55% | 35 to 40% |
| 163 | 50 to 55% | 40 to 45% |
| 164 | 50 to 55% | 45 to 50% |
| 165 | 55 to 60% | 1 to 5% |
| 166 | 55 to 60% | 5 to 10% |
| 167 | 55 to 60% | 10 to 15% |
| 168 | 55 to 60% | 15 to 20% |
| 169 | 55 to 60% | 20 to 25% |
| 170 | 55 to 60% | 25 to 30% |
| 171 | 55 to 60% | 30 to 35% |
| 172 | 55 to 60% | 35 to 40% |
| 173 | 55 to 60% | 40 to 45% |
| 174 | 60 to 65% | 1 to 5% |
| 175 | 60 to 65% | 5 to 10% |
| 176 | 60 to 65% | 10 to 15% |
| 177 | 60 to 65% | 15 to 20% |
| 178 | 60 to 65% | 20 to 25% |
| 179 | 60 to 65% | 25 to 30% |
| 180 | 60 to 65% | 30 to 35% |
| 181 | 60 to 65% | 35 to 40% |
| 182 | 65 to 70% | 1 to 5% |
| 183 | 65 to 70% | 5 to 10% |
| 184 | 65 to 70% | 10 to 15% |
| 185 | 65 to 70% | 15 to 20% |
| 186 | 65 to 70% | 20 to 25% |
| 187 | 65 to 70% | 25 to 30% |
| 188 | 65 to 70% | 30 to 35% |
| 189 | 70 to 75% | 1 to 5% |
| 190 | 70 to 75% | 5 to 10% |
| 191 | 70 to 75% | 10 to 15% |
| 192 | 70 to 75% | 15 to 20% |
| 193 | 70 to 75% | 20 to 25% |
| 194 | 70 to 75% | 25 to 30% |
| 195 | 75 to 80% | 1 to 5% |
| 196 | 75 to 80% | 5 to 10% |
| 197 | 75 to 80% | 10 to 15% |
| 198 | 75 to 80% | 15 to 20% |
| 199 | 75 to 80% | 20 to 25% |
| 200 | 80 to 85% | 1 to 5% |
| 201 | 80 to 85% | 5 to 10% |
| 202 | 80 to 85% | 10 to 15% |
| 203 | 80 to 85% | 15 to 20% |
| 204 | 85 to 90% | 1 to 5% |
| 205 | 85 to 90% | 5 to 10% |
| 206 | 85 to 90% | 10 to 15% |
| 207 | 90 to 95% | 1 to 5% |
| 208 | 90 to 95% | 5 to 10% |
| 209 | 95 to 99% | 1 to 5% |

It should be understood that similar formulations to those mentioned in the above table can also be prepared based on two (or more than two) polyamides A and/or two (or more than two) polyamides B, in which case the weight proportions indicated in the table relate to the total of the polyamide(s) A on the one hand and the total of the polyamide(s) B on the other hand.

Some embodiments of ternary formulations based on one polyamide A, one polyamide B and one polyamide C (plus the optional additives described below), with $C_A<C_B<C_C$ (and with for example $C_A \leq 7.5$, $7.5 \leq C_B < 10$ and $10 \leq C_C$) are summarized in the following table, the weight proportions being relative to the total composition:

| Formulation No. | A (wt. %) | B (wt. %) | C (wt. %) |
| --- | --- | --- | --- |
| 210 | 1 to 10% | 1 to 10% | 1 to 10% |
| 211 | 1 to 10% | 1 to 10% | 10 to 20% |
| 212 | 1 to 10% | 1 to 10% | 20 to 30% |
| 213 | 1 to 10% | 1 to 10% | 30 to 40% |

| Formulation No. | A (wt. %) | B (wt. %) | C (wt. %) |
| --- | --- | --- | --- |
| 214 | 1 to 10% | 1 to 10% | 40 to 50% |
| 215 | 1 to 10% | 1 to 10% | 50 to 60% |
| 216 | 1 to 10% | 1 to 10% | 60 to 70% |
| 217 | 1 to 10% | 1 to 10% | 70 to 80% |
| 218 | 1 to 10% | 1 to 10% | 80 to 90% |
| 219 | 1 to 9% | 1 to 9% | 90 to 98% |
| 220 | 1 to 10% | 10 to 20% | 1 to 10% |
| 221 | 1 to 10% | 10 to 20% | 10 to 20% |
| 222 | 1 to 10% | 10 to 20% | 20 to 30% |
| 223 | 1 to 10% | 10 to 20% | 30 to 40% |
| 224 | 1 to 10% | 10 to 20% | 40 to 50% |
| 225 | 1 to 10% | 10 to 20% | 50 to 60% |
| 226 | 1 to 10% | 10 to 20% | 60 to 70% |
| 227 | 1 to 10% | 10 to 20% | 70 to 80% |
| 228 | 1 to 10% | 10 to 19% | 80 to 89% |
| 229 | 1 to 10% | 20 to 30% | 1 to 10% |
| 230 | 1 to 10% | 20 to 30% | 10 to 20% |
| 231 | 1 to 10% | 20 to 30% | 20 to 30% |
| 232 | 1 to 10% | 20 to 30% | 30 to 40% |
| 233 | 1 to 10% | 20 to 30% | 40 to 50% |
| 234 | 1 to 10% | 20 to 30% | 50 to 60% |
| 235 | 1 to 10% | 20 to 30% | 60 to 70% |
| 236 | 1 to 10% | 20 to 29% | 70 to 79% |
| 237 | 1 to 10% | 30 to 40% | 1 to 10% |
| 238 | 1 to 10% | 30 to 40% | 10 to 20% |
| 239 | 1 to 10% | 30 to 40% | 20 to 30% |
| 240 | 1 to 10% | 30 to 40% | 30 to 40% |
| 241 | 1 to 10% | 30 to 40% | 40 to 50% |
| 242 | 1 to 10% | 30 to 40% | 50 to 60% |
| 243 | 1 to 10% | 30 to 39% | 60 to 69% |
| 244 | 1 to 10% | 40 to 50% | 1 to 10% |
| 245 | 1 to 10% | 40 to 50% | 10 to 20% |
| 246 | 1 to 10% | 40 to 50% | 20 to 30% |
| 247 | 1 to 10% | 40 to 50% | 30 to 40% |
| 248 | 1 to 10% | 40 to 50% | 40 to 50% |
| 249 | 1 to 10% | 40 to 49% | 50 to 59% |
| 250 | 1 to 10% | 50 to 60% | 1 to 10% |
| 251 | 1 to 10% | 50 to 60% | 10 to 20% |
| 252 | 1 to 10% | 50 to 60% | 20 to 30% |
| 253 | 1 to 10% | 50 to 60% | 30 to 40% |
| 254 | 1 to 10% | 50 to 59% | 40 to 49% |
| 255 | 1 to 10% | 60 to 70% | 1 to 10% |
| 256 | 1 to 10% | 60 to 70% | 10 to 20% |
| 257 | 1 to 10% | 60 to 70% | 20 to 30% |
| 258 | 1 to 10% | 60 to 69% | 30 to 39% |
| 259 | 1 to 10% | 70 to 80% | 1 to 10% |
| 260 | 1 to 10% | 70 to 80% | 10 to 20% |
| 261 | 1 to 10% | 70 to 79% | 20 to 29% |
| 262 | 1 to 10% | 80 to 90% | 1 to 10% |
| 263 | 1 to 10% | 80 to 89% | 10 to 19% |
| 264 | 1 to 9% | 90 to 98% | 1 to 9% |
| 265 | 10 to 20% | 1 to 10% | 1 to 10% |
| 266 | 10 to 20% | 1 to 10% | 10 to 20% |
| 267 | 10 to 20% | 1 to 10% | 20 to 30% |
| 268 | 10 to 20% | 1 to 10% | 30 to 40% |
| 269 | 10 to 20% | 1 to 10% | 40 to 50% |
| 270 | 10 to 20% | 1 to 10% | 50 to 60% |
| 271 | 10 to 20% | 1 to 10% | 60 to 70% |
| 272 | 10 to 20% | 1 to 10% | 70 to 80% |
| 273 | 10 to 19% | 1 to 10% | 80 to 89% |
| 274 | 10 to 20% | 10 to 20% | 1 to 10% |
| 275 | 10 to 20% | 10 to 20% | 10 to 20% |
| 276 | 10 to 20% | 10 to 20% | 20 to 30% |
| 277 | 10 to 20% | 10 to 20% | 30 to 40% |
| 278 | 10 to 20% | 10 to 20% | 40 to 50% |
| 279 | 10 to 20% | 10 to 20% | 50 to 60% |
| 280 | 10 to 20% | 10 to 20% | 60 to 70% |
| 281 | 10 to 20% | 10 to 20% | 70 to 80% |
| 282 | 10 to 20% | 20 to 30% | 1 to 10% |
| 283 | 10 to 20% | 20 to 30% | 10 to 20% |
| 284 | 10 to 20% | 20 to 30% | 20 to 30% |
| 285 | 10 to 20% | 20 to 30% | 30 to 40% |
| 286 | 10 to 20% | 20 to 30% | 40 to 50% |
| 287 | 10 to 20% | 20 to 30% | 50 to 60% |
| 288 | 10 to 20% | 20 to 30% | 60 to 70% |
| 289 | 10 to 20% | 30 to 40% | 1 to 10% |
| 290 | 10 to 20% | 30 to 40% | 10 to 20% |
| 291 | 10 to 20% | 30 to 40% | 20 to 30% |
| 292 | 10 to 20% | 30 to 40% | 30 to 40% |
| 293 | 10 to 20% | 30 to 40% | 40 to 50% |
| 294 | 10 to 20% | 30 to 40% | 50 to 60% |
| 295 | 10 to 20% | 40 to 50% | 1 to 10% |
| 296 | 10 to 20% | 40 to 50% | 10 to 20% |
| 297 | 10 to 20% | 40 to 50% | 20 to 30% |
| 298 | 10 to 20% | 40 to 50% | 30 to 40% |
| 299 | 10 to 20% | 40 to 50% | 40 to 50% |
| 300 | 10 to 20% | 50 to 60% | 1 to 10% |
| 301 | 10 to 20% | 50 to 60% | 10 to 20% |
| 302 | 10 to 20% | 50 to 60% | 20 to 30% |
| 303 | 10 to 20% | 50 to 60% | 30 to 40% |
| 304 | 10 to 20% | 60 to 70% | 1 to 10% |
| 305 | 10 to 20% | 60 to 70% | 10 to 20% |
| 306 | 10 to 20% | 60 to 70% | 20 to 30% |
| 307 | 10 to 20% | 70 to 80% | 1 to 10% |
| 308 | 10 to 20% | 70 to 80% | 10 to 20% |
| 309 | 10 to 19% | 80 to 89% | 1 to 10% |
| 310 | 20 to 30% | 1 to 10% | 1 to 10% |
| 311 | 20 to 30% | 1 to 10% | 10 to 20% |
| 312 | 20 to 30% | 1 to 10% | 20 to 30% |
| 313 | 20 to 30% | 1 to 10% | 30 to 40% |
| 314 | 20 to 30% | 1 to 10% | 40 to 50% |
| 315 | 20 to 30% | 1 to 10% | 50 to 60% |
| 316 | 20 to 30% | 1 to 10% | 60 to 70% |
| 317 | 20 to 29% | 1 to 10% | 70 to 79% |
| 318 | 20 to 30% | 10 to 20% | 1 to 10% |
| 319 | 20 to 30% | 10 to 20% | 10 to 20% |
| 320 | 20 to 30% | 10 to 20% | 20 to 30% |
| 321 | 20 to 30% | 10 to 20% | 30 to 40% |
| 322 | 20 to 30% | 10 to 20% | 40 to 50% |
| 323 | 20 to 30% | 10 to 20% | 50 to 60% |
| 324 | 20 to 30% | 10 to 20% | 60 to 70% |
| 325 | 20 to 30% | 20 to 30% | 1 to 10% |
| 326 | 20 to 30% | 20 to 30% | 10 to 20% |
| 327 | 20 to 30% | 20 to 30% | 20 to 30% |
| 328 | 20 to 30% | 20 to 30% | 30 to 40% |
| 329 | 20 to 30% | 20 to 30% | 40 to 50% |
| 330 | 20 to 30% | 20 to 30% | 50 to 60% |
| 331 | 20 to 30% | 30 to 40% | 1 to 10% |
| 332 | 20 to 30% | 30 to 40% | 10 to 20% |
| 333 | 20 to 30% | 30 to 40% | 20 to 30% |
| 334 | 20 to 30% | 30 to 40% | 30 to 40% |
| 335 | 20 to 30% | 30 to 40% | 40 to 50% |
| 336 | 20 to 30% | 40 to 50% | 1 to 10% |
| 337 | 20 to 30% | 40 to 50% | 10 to 20% |
| 338 | 20 to 30% | 40 to 50% | 20 to 30% |
| 339 | 20 to 30% | 40 to 50% | 30 to 40% |
| 340 | 20 to 30% | 50 to 60% | 1 to 10% |
| 341 | 20 to 30% | 50 to 60% | 10 to 20% |
| 342 | 20 to 30% | 50 to 60% | 20 to 30% |
| 343 | 20 to 30% | 60 to 70% | 1 to 10% |
| 343 | 20 to 30% | 60 to 70% | 10 to 20% |
| 344 | 20 to 29% | 70 to 79% | 1 to 10% |
| 345 | 30 to 40% | 1 to 10% | 1 to 10% |
| 346 | 30 to 40% | 1 to 10% | 10 to 20% |
| 347 | 30 to 40% | 1 to 10% | 20 to 30% |
| 348 | 30 to 40% | 1 to 10% | 30 to 40% |
| 349 | 30 to 40% | 1 to 10% | 40 to 50% |
| 350 | 30 to 40% | 1 to 10% | 50 to 60% |
| 351 | 30 to 39% | 1 to 10% | 60 to 69% |
| 352 | 30 to 40% | 10 to 20% | 1 to 10% |
| 353 | 30 to 40% | 10 to 20% | 10 to 20% |
| 354 | 30 to 40% | 10 to 20% | 20 to 30% |
| 355 | 30 to 40% | 10 to 20% | 30 to 40% |
| 356 | 30 to 40% | 10 to 20% | 40 to 50% |
| 357 | 30 to 40% | 10 to 20% | 50 to 60% |
| 358 | 30 to 40% | 20 to 30% | 1 to 10% |
| 359 | 30 to 40% | 20 to 30% | 10 to 20% |
| 360 | 30 to 40% | 20 to 30% | 20 to 30% |
| 361 | 30 to 40% | 20 to 30% | 30 to 40% |
| 362 | 30 to 40% | 20 to 30% | 40 to 50% |
| 363 | 30 to 40% | 30 to 40% | 1 to 10% |
| 364 | 30 to 40% | 30 to 40% | 10 to 20% |
| 365 | 30 to 40% | 30 to 40% | 20 to 30% |
| 366 | 30 to 40% | 30 to 40% | 30 to 40% |

-continued

| Formulation No. | A (wt. %) | B (wt. %) | C (wt. %) |
|---|---|---|---|
| 367 | 30 to 40% | 40 to 50% | 1 to 10% |
| 368 | 30 to 40% | 40 to 50% | 10 to 20% |
| 369 | 30 to 40% | 40 to 50% | 20 to 30% |
| 370 | 30 to 40% | 50 to 60% | 1 to 10% |
| 371 | 30 to 40% | 50 to 60% | 10 to 20% |
| 372 | 30 to 39% | 60 to 69% | 1 to 10% |
| 373 | 40 to 50% | 1 to 10% | 1 to 10% |
| 374 | 40 to 50% | 1 to 10% | 10 to 20% |
| 375 | 40 to 50% | 1 to 10% | 20 to 30% |
| 376 | 40 to 50% | 1 to 10% | 30 to 40% |
| 377 | 40 to 50% | 1 to 10% | 40 to 50% |
| 378 | 40 to 49% | 1 to 10% | 50 to 59% |
| 379 | 40 to 50% | 10 to 20% | 1 to 10% |
| 380 | 40 to 50% | 10 to 20% | 10 to 20% |
| 381 | 40 to 50% | 10 to 20% | 20 to 30% |
| 382 | 40 to 50% | 10 to 20% | 30 to 40% |
| 383 | 40 to 50% | 10 to 20% | 40 to 50% |
| 384 | 40 to 50% | 20 to 30% | 1 to 10% |
| 385 | 40 to 50% | 20 to 30% | 10 to 20% |
| 386 | 40 to 50% | 20 to 30% | 20 to 30% |
| 387 | 40 to 50% | 20 to 30% | 30 to 40% |
| 388 | 40 to 50% | 30 to 40% | 1 to 10% |
| 389 | 40 to 50% | 30 to 40% | 10 to 20% |
| 390 | 40 to 50% | 30 to 40% | 20 to 30% |
| 391 | 40 to 50% | 40 to 50% | 1 to 10% |
| 392 | 40 to 50% | 40 to 50% | 10 to 20% |
| 393 | 40 to 49% | 50 to 59% | 1 to 10% |
| 394 | 50 to 60% | 1 to 10% | 1 to 10% |
| 395 | 50 to 60% | 1 to 10% | 10 to 20% |
| 396 | 50 to 60% | 1 to 10% | 20 to 30% |
| 397 | 50 to 60% | 1 to 10% | 30 to 40% |
| 398 | 50 to 59% | 1 to 10% | 40 to 49% |
| 399 | 50 to 60% | 10 to 20% | 1 to 10% |
| 400 | 50 to 60% | 10 to 20% | 10 to 20% |
| 401 | 50 to 60% | 10 to 20% | 20 to 30% |
| 402 | 50 to 60% | 10 to 20% | 30 to 40% |
| 403 | 50 to 60% | 20 to 30% | 1 to 10% |
| 404 | 50 to 60% | 20 to 30% | 10 to 20% |
| 405 | 50 to 60% | 20 to 30% | 20 to 30% |
| 406 | 50 to 60% | 30 to 40% | 1 to 10% |
| 407 | 50 to 60% | 30 to 40% | 10 to 20% |
| 408 | 50 to 59% | 40 to 49% | 1 to 10% |
| 409 | 60 to 70% | 1 to 10% | 1 to 10% |
| 410 | 60 to 70% | 1 to 10% | 10 to 20% |
| 411 | 60 to 70% | 1 to 10% | 20 to 30% |
| 412 | 60 to 69% | 1 to 10% | 30 to 39% |
| 413 | 60 to 70% | 10 to 20% | 1 to 10% |
| 414 | 60 to 70% | 10 to 20% | 10 to 20% |
| 415 | 60 to 70% | 10 to 20% | 20 to 30% |
| 416 | 60 to 70% | 20 to 30% | 1 to 10% |
| 417 | 60 to 70% | 20 to 30% | 10 to 20% |
| 418 | 60 to 69% | 30 to 39% | 1 to 10% |
| 419 | 70 to 80% | 1 to 10% | 1 to 10% |
| 420 | 70 to 80% | 1 to 10% | 10 to 20% |
| 421 | 70 to 79% | 1 to 10% | 20 to 29% |
| 422 | 70 to 80% | 10 to 20% | 1 to 10% |
| 423 | 70 to 80% | 10 to 20% | 10 to 20% |
| 424 | 70 to 79% | 20 to 29% | 1 to 10% |
| 425 | 80 to 90% | 1 to 10% | 1 to 10% |
| 426 | 80 to 89% | 1 to 10% | 10 to 19% |
| 427 | 80 to 89% | 10 to 19% | 1 to 10% |
| 428 | 90 to 98% | 1 to 9% | 1 to 9% |

It should be understood that similar formulations to those mentioned in the above table can also be prepared based on two (or more than two) polyamides A and/or two (or more than two) polyamides B and/or two (or more than two) polyamides C, in which case the weight proportions indicated in the table relate to the total of the polyamide(s) A, B and C respectively.

The total weight proportion of polyamides in the composition may be from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 100%.

The composition may comprise various additives in addition to the above-described polyamides.

The additives may comprise an impact modifier, a processing aid, a filler, a stabilizer, a nucleating agent, a dye, a pigment and/or a fireproofing agent.

The impact modifier may be a non-rigid polymer having a flexural modulus of less than 100 MPa measured according to the ISO 178:2010 standard.

This polymer preferably has a low glass transition temperature, i.e. of less than 0° C.

The impact modifier is, very preferentially, chemically functionalized so as to be able to react with the above polyamides and to form an alloy with them.

The impact modifier is preferentially one or more polyolefins, some or all of them bearing a function selected from carboxylic acid, carboxylic anhydride and epoxide functions and any other function capable of chemically reacting with polyamides, typically via the amine chain ends (in the case of carboxylic acid or carboxylic anhydride) or via the acid chain ends (in the case of epoxide, in particular glycidyl methacrylate).

The polyolefin may more particularly be selected from:
- a copolymer of ethylene and propylene of elastomeric nature (EPR),
- an ethylene-propylene-diene copolymer of elastomeric nature (EPDM) and
- an ethylene/alkyl (meth)acrylate copolymer.

Another possibility is to use a polyether block amide (PEBA) as an non-functionalized impact modifier, said PEBA having a flexural modulus of less than 100 MPa measured according to the ISO 178:2010 standard.

The weight proportion of impact modifier in the composition, when present, is advantageously from 1 to 40%, preferably from 3 to 30%, more preferably from 5 to 20%.

A stabilizer may also be used, and in particular a thermal stabilizer. The weight proportion of thermal stabilizer in the composition may be from 0 to 4%, notably from 0.01 to 2% or from 0.1 to 1.5%.

A copper-based thermal stabilizer may be used, in particular a copper salt or a copper salt derivative, such as copper iodide, copper bromide, copper halides, derivatives of mixtures thereof. Copper salts I are preferred. Examples are copper iodide, copper bromide, copper chloride, copper fluoride, copper thiocyanate, copper nitrate, copper acetate, copper naphthenate, copper caprate, copper laurate, copper stearate, copper acetylacetonate, and copper oxide.

Another possible thermal stabilizer is a metallic halide salt such as LiI, NaI, KI, $MgI_2$, KBr or $CaI_2$. KI and KBr are preferred.

Preferably, the copper-based thermal stabilizer is a mixture of potassium iodide and copper iodide (KI/CuI), more preferably with a weight ratio of 90:10 to 70:30. Such a stabilizer is marketed under the designation Polyadd P201 by Ciba.

Copper-based stabilizers are further described in document U.S. Pat. No. 2,705,227.

Complexed copper may also be used, as marketed by Brueggemann under the designations Bruggolen H3336, H3337, H3373.

Other possible thermal stabilizers are sterically-hindered phenolic antioxidants. These compounds are described in document US 2012/0279605, at paragraphs [0025] et [0026], incorporated herein by reference.

UV stabilizers may also be present, in particular phosphites or sterically hindered amine-based stabilizers (HALS), which are 2,2,6,6-tetramethylpiperidine derivatives. They can be used e.g. within a range of 0 to 1 wt. %, or 0.01 à 0.5 wt. %.

Processing aids may include lubricants and/or release agents.

Among the processing aids, mention may be made of stearates, such as calcium or zinc stearate, natural waxes, and tetrafluoroethylene-based polymers. The weight proportion of processing aids in the composition, if present, may typically be from 0.01 to 0.3%, notably from 0.02 to 0.1%.

Among the dyes and pigments, mention may be made notably of carbon black and of optical brighteners. The weight proportion of dyes and/or pigments in the composition, if present, may typically be from 0.1 to 0.2%.

Among the fillers, mention may be made of silica, graphite, expanded graphite, carbon black, glass beads, kaolin, magnesia, slag, talc, carbon nanocharges (such as carbon nanotubes), metallic oxides (titanium oxide), metals, and more preferably fibers (aramides, glass fibers, carbon fibers).

The weight proportion of fillers in the composition may be from 1 to 65%, preferably from 1 to 50%, more preferably from 5 to 40%, most preferably be from 10 to 35%. In particular, glass fibers may be present in a weight proportion of from 10 to 65%, preferably from 20 to 40%. Alternatively or complementarily, carbon fibers may be present in a weight proportion from 5 to 40%, preferably of 5 to 25%, preferably from 10 to 20%. A mixture of carbon fibers and glass fibers may also be used.

The use of fibers is particularly useful for reinforcing the connectors made from the composition. Said fibers may for instance have an average length of 0.05 to 1 mm, notably of 0.1 to 0.5 mm. Their average diameter can be from 5 to 20 µm, preferably from 6 to 14 µm.

Some of the fillers may be antistatic compounds and may also have a coloring effect on the composition.

The composition of an embodiment of the disclosure may comprise one or more additional polymers, in addition to the above polyamides (and optionally the above polyolefins).

Such additional polymers may be for instance phenylene polysulfide (PPS), polyphenylene oxide (PPO), a fluorinated polymer, and mixtures thereof.

The composition may contain up to 20 wt. % of such additional polymers.

Alternatively and preferably, the composition does not contain any such additional polymer.

According to one embodiment, the composition of an embodiment of the disclosure comprises, or essentially consists of, or consists of:
  1 to 50 wt. %, preferably 2 to 45 wt. % of the abovementioned first polyamide A (notably PA 6);
  10 to 80 wt. %, preferably 20 to 70 wt. % of the abovementioned second polyamide B (and optionally third polyamide C);
  0 to 15 wt. % of impact modifier(s), such as EPR;
  10 to 40 wt. % of filler(s), such as glass fibers or carbon fibers;
  0 to 2% of stabilizer(s).

The composition used in an embodiment of the disclosure may be prepared by compounding all components together. The composition is usually recovered in the form of pellets or granules.

The connectors or connector parts can be manufactured by injection molding. Injection molding consists of high pressure injection of the raw material (polyamide composition) into a mold which shapes it into the desired shape.

The polyamide composition is preferably provided in a pelletized form. It is fed through a hopper into a heated barrel with a reciprocating screw. The screw delivers the raw material forward, up through a check valve. The melted material is collected at the front of the screw. It is then forced at high pressure and velocity into the mold. The molded part is cooled. The polyamide recrystallizes during the cooling time.

It should be noted that as an alternative to feeding the complete composition to the heated barrel in the form of granules or pellets, it is also possible to add part (or all) of the components separately to the barrel, in which case the complete composition is made in situ during the injection molding process.

The connectors or connector parts of an embodiment of the disclosure are preferably made of one piece and are preferably made of a single layer. They preferably have a uniform composition.

The connectors or connector parts of an embodiment of the disclosure may be welded to one or more tubes and/or to other functional objects (such as a filter).

Welding may notably be achieved by hot gas welding, speed tip welding, extrusion welding, contact welding, overmolding, hot plate welding, high frequency welding, injection welding, ultrasound welding, friction welding, spin welding and solvent welding.

The connectors or connector parts may in particular be welded to articles or layers made of polyamide compositions, such as polyamide compositions based on PA 6, or on PA 6.T, or on PA 12, or on PA 6.10, or on PA 6.12 or on PA 10.12.

The connectors or connector parts of an embodiment of the disclosure may thus be incorporated into fluidic circuits such as circuits for storing and conveying liquid or gases, in particular fuel or refrigerant, and more particularly in a motor vehicle.

EXAMPLES

The following examples illustrate an embodiment of the disclosure without limiting it.

Eleven polyamide compositions I-1 to I-11 according to an embodiment of the disclosure, as well as four comparative polyamide compositions C-1 to C-4 were prepared as follows:

The compositions were prepared using a usual compounding process. Use was made of a Werner 40 twin-screw extruder, running at 300 rpm, 60 kg/h, with the temperature set at 280° C. on all the barrels in order to melt the polymers. The polymers (polyamides and impact modifier) were introduced at the beginning of the screw, the reinforcing agent (glass fiber, carbon fiber) was introduced using a side feeder, in the middle of the screw.

The respective formulations are summarized in the table below, the proportions being expressed in weight percentage:

| Ex. No. | PA 6.10 | PA 6.12 | PA 10.10 | PA 6 | PA 12 | EPR | CF | GF | Stab. #1 | Stab. #2 |
|---|---|---|---|---|---|---|---|---|---|---|
| I-1 | 44 | — | — | 10 | 15 | — | — | 30 | 1 | — |
| I-2 | — | 44 | — | 10 | 15 | — | — | 30 | 1 | — |
| I-3 | 10 | — | — | 44 | 15 | — | — | 30 | 1 | — |
| I-4 | 10 | — | — | 15 | 44 | — | — | 30 | 1 | — |
| I-5 | 10 | — | 44 | 15 | — | — | — | 30 | 1 | — |
| I-6 | 63 | — | — | 3 | 3 | — | — | 30 | 1 | — |
| I-7 | — | 44 | — | 5 | 10 | 10 | — | 30 | 1 | — |
| I-8 | 44.5 | — | — | 10 | 15 | — | — | 30 | — | 0.5 |
| I-9 | 59 | — | — | 10 | 15 | — | 15 | — | 1 | — |

-continued

| Ex. No. | PA 6.10 | PA 6.12 | PA 10.10 | PA 6 | PA 12 | EPR | CF | GF | Stab. #1 | Stab. #2 |
|---------|---------|---------|----------|------|-------|-----|----|----|----------|----------|
| I-10 | — | 44 | — | 15 | — | 10 | — | 30 | 1 | — |
| I-11 | 15 | — | — | — | 44 | 10 | — | 30 | 1 | — |
| C-1 | — | — | — | — | 69 | — | — | 30 | 1 | — |
| C-2 | — | 69 | — | — | — | — | — | 30 | 1 | — |
| C-3 | — | — | 69 | — | — | — | — | 30 | 1 | — |
| C-4 | — | 59 | — | — | — | 10 | — | 30 | 1 | — |

In the above table, EPR means "ethylene propylene rubber" (Exxellor VA1801 from Exxon), CF means "carbon fibers" (Tenax A 243 from Toho Tenax), GF means "glass fibers" (type 3540, from PPG), Stab.#1 designates a mixture of organic stabilizers composed of 0.8% phenol (Lowinox 44B25 from Great Lakes) and 0.2% phosphite (Irgafos 168 from Ciba) and Stab.#2 designates a mixture of mineral stabilizers based on copper iodide and potassium iodide (Polyadd P201 from Ciba).

The PA 6.10 polyamide has a number-average molecular mass Mn of 19,000 and a melting point of 223° C.

The PA 6.12 polyamide has a number-average molecular mass Mn of 19,000 and a melting point of 218° C.

The PA 10.10 polyamide has a number-average molecular mass Mn of 20,000 and a melting point of 198° C.

The PA 6 polyamide has a number-average molecular mass Mn of 18,000 and a melting point of 220° C.

The PA 12 polyamide has a number-average molecular mass Mn of 23,000 and a melting point of 178° C.

Melting points have been determined according to ISO 11357-3 (2013).

These various compositions were tested in terms of shrinkage and adhesion to several polyamide-based substrates, according to the following protocols.

Shrinkage evaluation: the various compositions were shaped by injection molding into 100×100×2 mm plates. The plate dimensions were accurately measured after a conditioning time of 24 hours at room temperature and then compared to the initial dimensions of the mold at the same temperature used for plate molding. All compositions were molded with a conventional injection molding machine with the barrel heated at 290° C., the mold cavity being temperature controlled at 60° C. The thickness of the plates was in the same range of thickness than that of usual connectors, and the plates were produced using the same processing technique so as to be representative of the actual shrinkage of the connectors.

Adhesion evaluation: adhesion was assessed using an overmolding process, i.e. a two-step process. First, an insert part was molded out of one reference polyamide A, B or C. Second, the insert molded in the first part was placed in a mold with the same part geometry but with a higher thickness, and was overmolded by one of the tested compositions. This procedure was then repeated for all the compositions described in the examples, the insert part being alternatively polyamide A, B or C. The overmolded geometry was chosen so as to be able to perform a peeling test where the adhesion between the tested composition and the reference polyamide A, B or C was characterized.

During an overmolding process, when the overmolding material (here, the composition described in the examples) flows onto the insert material, due to the high temperature of the molten polymer (typically 290° C.), a small interface region between the two materials is molten (about 100 μm). Therefore, the overmolding process is found to be representative of welding techniques such as spin welding, plate welding, ultrasonic welding or high frequency welding,— where a partial melting of the material to be welded is used to generate adhesion.

The results are summarized in the table below, with the following nomenclature: 1=fully satisfactory; 2=acceptable; 3=unsatisfactory; 4=extremely unsatisfactory.

| Ex. No. | Adhesion to PA 6 or PA 6.T | Adhesion to PA 12 | Adhesion to PA 6.10 or PA 6.12 | Shrinkage |
|---------|---------|---------|---------|---------|
| I-1 | 1 | 1 | 1 | 1 |
| I-2 | 1 | 1 | 1 | 1 |
| I-3 | 1 | 1 | 1 | 1 |
| I-4 | 1 | 1 | 1 | 1 |
| I-5 | 1 | 1 | 1 | 1 |
| I-6 | 1 | 1 | 1 | 1 |
| I-7 | 1 | 1 | 1 | 1 |
| I-8 | 1 | 1 | 1 | 1 |
| I-9 | 1 | 1 | 1 | 1 |
| I-10 | 1 | 2 | 1 | 1 |
| I-11 | 2 | 1 | 1 | 1 |
| C-1 | 4 | 1 | 3 | 1 |
| C-2 | 3 | 3 | 1 | 4 |
| C-3 | 1 | 4 | 3 | 4 |
| C-4 | 3 | 3 | 1 | 4 |

Embodiments of the disclosure may include:

1. A tube connector part made from a polyamide composition, the polyamide composition comprising at least one first polyamide A having an average number of carbon atoms per nitrogen atom $C_A$ and at least one second polyamide B having an average number of carbon atoms per nitrogen atom $C_B$, wherein $C_A \leq 8.5$ and $C_B \geq 7.5$, and wherein $C_A < C_B$.
2. The tube connector part of embodiment 1, wherein the difference $C_B - C_A$ is from 1 to 6, more preferably from 2 to 4, or from 2 to 3.
3. The tube connector part of embodiments 1 or 2, wherein $C_A \leq 7.5$, preferably $C_A \leq 6.5$ and most preferably $C_A = 6$.
4. The tube connector part of one of embodiments 1 to 3, wherein the at least one first polyamide A is selected from PA 6, PA 4.6, PA 6.6, PA 6/6.6, PA 6/6.T, PA 6.6/6.T, PA 6.6/6.I, PA 6.I/6.T, PA 6.6/6.I/6.T, PA 6.10 and mixtures thereof, and preferably is PA 6.
5. The tube connector part of one of embodiments 1 to 4, wherein the composition comprises from 1 to 70 wt. %, preferably from 2 to 60 wt. % and more preferably from 3 to 50 wt. %, in particular from 3 to 35 wt. % of the at least one first polyamide A.
6. The tube connector part of one of embodiments 1 to 5, wherein the second polyamide B is selected from PA 6.10, PA 6.12, PA 6.14, PA 10.10, PA 11, PA 12, PA 10.12, PA 6.18, PA 12.T, PA 12/10.T, PA 10.10/10.T, PA B.12, PA B.10/10.10, PA IPD.10, PA B.I/12 and mixtures thereof, preferably from PA 6.10, PA 6.12, PA 10.10, PA 10.12, PA 12 and mixtures thereof, and more preferably is PA 6.12, optionally in admixture with another polyamide.
7. The tube connector part of one of embodiments 1 to 6, wherein the composition comprises from 1 to 70 wt. %, preferably from 10 to 60 wt. % and more preferably from 20 to 50 wt. % of the at least second polyamide B.
8. The tube connector part of one of embodiments 1 to 7, wherein the composition consists of one first polyamide A, one second polyamide B and optionally non-polyamide additives; and wherein, preferably, the first polyamide A is PA 6 and the second polyamide B is PA 6.12.
9. The tube connector part of one of embodiments 1 to 7, wherein the composition comprises, in addition to the first polyamide A and the second polyamide B, at least one third polyamide C having an average number of carbon atoms per nitrogen atom $C_C$, wherein $C_C \geq 7.5$ and $C_C \geq CB$.

10. The tube connector part of embodiment 9, wherein $C_C \geq 7.5$ and $C_C > C_B$.

11. The tube connector part of embodiments 9 or 10, wherein the difference $C_C-C_B$ is from 1 to 4, preferably from 2 to 3.

12. The tube connector part of one of embodiments 9 to 11, wherein the second polyamide B is selected from PA 6.10, PA 6.12 and a mixture thereof; and/or the third polyamide C is selected from PA 6.14, PA 10.10, PA 11, PA 12, PA 10.12, PA 6.18, PA 12.T, PA 12/10.T, PA 10.10/10.T, PA B.12, PA B.10/10.10, PA IPD.10, PA B.I/12 and mixtures thereof, preferably from PA 10.10, PA 10.12, PA 12 and a mixture thereof; and more preferably is PA 12.

13. The tube connector part of one of embodiments 9 to 12, wherein the composition comprises from 1 to 80 wt. %, preferably from 5 to 70 wt. % and more preferably from 10 to 65 wt. % of the at least one second polyamide B; and/or the composition comprises from 1 to 70 wt. %, preferably from 2 to 60 wt. % and more preferably from 3 to 50 wt. % of the at least one third polyamide C.

14. The tube connector part of one of embodiments 9 to 13, wherein the composition consists of one first polyamide A, one second polyamide B, one third polyamide C and optionally non-polyamide additives; and wherein, preferably, the first polyamide A is PA 6, the second polyamide B is PA 6.10 or PA 6.12, and the third polyamide C is PA 10.10, PA 10.12 or PA 12.

15. The tube connector part of one of embodiments 1 to 14, wherein the amount of polyamides in the composition is from 30 to 100 wt. %, preferably from 50 to 99 wt. %, more preferably from 60 to 95 wt. %, and most preferably from 65 to 85 wt. %.

16. The tube connector part of one of embodiments 1 to 15, wherein the composition further comprises additives selected from impact modifiers, processing aids, fillers, stabilizers, nucleating agents, dyes, pigments, fireproofing agents and mixtures thereof; and wherein the composition preferably comprises additives selected from fillers, impact modifiers, stabilizers and combinations thereof; and the composition more preferably comprises:
from 10 to 40 wt. % of fillers, in particular glass fibers; and/or
from 0.1 to 2 wt. % of at least one stabilizer; and/or
from 5 to 20 wt. % of at least one functionalized impact modifier, in particular a copolymer of ethylene, preferably ethylene propylene elastomer copolymer.

17. The tube connector part of one of embodiments 1 to 16, which is configured for being welded to one or more tubes, preferably by spin welding, said tubes being preferably polyamide tubes.

18. The tube connector part of one of embodiments 1 to 17, which is part of a circuit for conveying liquids or gases in motor vehicles.

19. A process of making the tube connector part of one of embodiments 1 to 18, comprising melting and shaping the polyamide composition.

20. The process of embodiment 19, which is an injection molding process.

The invention claimed is:

1. A method of connecting a tube connector part to a tube or a functional part, the method comprising welding a tube connector part to the tube or functional part, wherein the tube connector part is made from a composition, the composition comprising at least one first polyamide A having an average number of carbon atoms per nitrogen atom CA and at least one second polyamide B having an average number of carbon atoms per nitrogen atom CB, wherein CA=8 and CB≥9, and wherein CA<CB, wherein the difference CB−CA is from 1 to 6, and
wherein the tube connector is not a tube,
wherein the tube connector is incorporated into a fluidic circuit for conveying liquids, and
wherein polyamide A is PA 6.10.

2. The method of connecting a tube connector part of claim 1, wherein the composition comprises from 1 to 70 wt. % of the at least one first polyamide A.

3. The method of connecting a tube connector part of claim 1, wherein the second polyamide B is selected from PA 6.12, PA 6.14, PA 10.10, PA 11, PA 12, PA 10.12, PA 6.18, PA 12.T, PA 12/10.T, PA 10.10/10.T, PA B.12, PA B.10/10.10, PA IPD.10, PA B.I/12 and mixtures thereof.

4. The method of connecting a tube connector part of claim 1, wherein the composition comprises from 1 to 70 wt. % of the at least second polyamide B.

5. The method of connecting a tube connector part of claim 1, wherein the composition consists of one first polyamide A, one second polyamide B and, optionally, non-polyamide additives.

6. The method of connecting a tube connector part of claim 1, wherein the composition comprises, in addition to the first polyamide A and the second polyamide B, at least one third polyamide C having an average number of carbon atoms per nitrogen atom CC, wherein CC≥9 and CC≥CB.

7. The method of connecting a tube connector part of claim 6, wherein CC≥9 and CC>CB.

8. The method of connecting a tube connector part of claim 6, wherein the difference CC−CB is from 1 to 4.

9. The method of connecting a tube connector part of claim 6, wherein the second polyamide B is selected from PA 6.12 ; and the third polyamide C is selected from PA 6.14, PA 10.10, PA 11, PA 12, PA 10.12, PA 6.18, PA 12.T, PA 12/10.T, PA 10.10/10.T, PA B.12, PA B.10/10.10, PA IPD.10, PA B.I/12 and mixtures thereof.

10. The method of connecting a tube connector part of claim 6, wherein the composition comprises from 1 to 80 wt. % of the at least one second polyamide B; and the composition comprises from 1 to 70 wt. % of the at least one third polyamide C.

11. The method of connecting a tube connector part of claim 6, wherein the composition consists of one first polyamide A, one second polyamide B, one third polyamide C and, optionally, non-polyamide additives.

12. The method of connecting a tube connector part of claim 1, wherein the amount of polyamides in the composition is from 30 to 100 wt. %.

13. The method of connecting a tube connector part of claim 1, wherein the composition further comprises additives selected from impact modifiers, processing aids, fillers, stabilizers, nucleating agents, dyes, pigments, fireproofing agents, or mixtures thereof.

14. The method of connecting a tube connector part of claim 1, wherein the fluidiccircuit conveys liquids in motor vehicles.

15. The method of connecting a tube connector part of claim 1, wherein the tube connector part is formed by an injection molding process.

16. The method of connecting a tube connector part of claim 15, wherein the tube connector part is welded to one or more tubes.

17. A method of connecting a tube connector part to at least one tube or a functional part, the method comprising welding a tube connector part to the tube or functional part, wherein the tube connector part is made from a composition, the composition comprising at least one first polyamide A having an average number of carbon atoms per nitrogen atom CA and at least one second polyamide B having an average number of carbon atoms per nitrogen atom CB, wherein CA=8 and CB≥9, and wherein CA<CB, wherein the difference CB–CA is from 1 to 6, wherein the tube connector part is formed by an injection molding process,
    wherein the tube connector part is not a tube,
    wherein the tube connector is incorporated into a fluidic circuit for conveying liquids, and wherein polyamide A is PA 6.10.

18. The method of connecting a tube connector part of claim 16, wherein the tube is a polyamide tube.

19. The method of connecting a tube connector part of claim 18, wherein the polyamide tube is a multilayer tube containing different polyamide components in the inner and outer layers.

20. The method of connecting a tube connector part of claim 19, wherein the multilayer tube has a PA 12-based outer layer and a PA 6-based inner layer.

21. The method of connecting a tube connector part of claim 1, wherein the welding is spin welding.

22. The method of connecting a tube connector part of claim 14, wherein the circuit is in a motor vehicle.

23. The method of connecting a tube connector part of claim 22, wherein the fluid is a refrigerant.

24. The method of connecting a tube connector part of claim 22, wherein the fluid is a fuel.

25. The method of connecting a tube connector part of claim 1, wherein the tube connector part is welded to the functional part.

26. The method of connecting a tube connector part of claim 25, wherein the functional part is a filter.

27. The method of connecting a tube connector part of claim 1, wherein the second polyamide B is selected from PA 10.10, PA 11, PA 12, PA 10.12, PA 12.T, PA 12/10.T, PA 10.10/10.T, PA B.12, PA B.10/10.10, PA IPD.10, PA B.I/12 and mixtures thereof.

28. The method of connecting a tube connector part of claim 1, wherein the composition further comprises carbon fibers in an amount that contributes 5% to the total weight of said composition.

29. The method of connecting a tube connector part of claim 1, wherein the composition comprises, in addition to the first polyamide A and the second polyamide B, at least one third polyamide C having an average number of carbon atoms per nitrogen atom CC, wherein CC≥9 and CC≥CB, and wherein the composition comprises, either:
    from 1 to 80 wt. % of the at least one second polyamide B; or
    from 1 to 70 wt. % of the at least one third polyamide C.

30. A weldable tube connector part made from a composition, the composition comprising at least one first polyamide A having an average number of carbon atoms per nitrogen atom CA and at least one second polyamide B having an average number of carbon atoms per nitrogen atom CB, wherein CA=8 and CB>8, and wherein CA<CB, wherein the composition further comprises, in addition to the first polyamide A and the second polyamide B, at least one third polyamide C having an average number of carbon atoms per nitrogen atom CC, wherein CC>8 and CC≥CB, and wherein the composition comprises, either:
    from 1 to 80 wt. % of the at least one second polyamide B; or
    from 1 to 70 wt. % of the at least one third polyamide C,
    wherein the tube connector part is nota tube,
    wherein the tube connector is incorporated into a fluidiccircuit for conveying liquids, and wherein polyamide A is PA 6.10.

31. The method of connecting a tube connector part of claim 1, wherein the tube connector part is made of a single layer of the composition.

\* \* \* \* \*